July 26, 1938.  J. MIHALYI  2,124,886
LIGHT CONTROLLING MECHANISM FOR CAMERAS
Filed Oct. 20, 1936  3 Sheets-Sheet 2
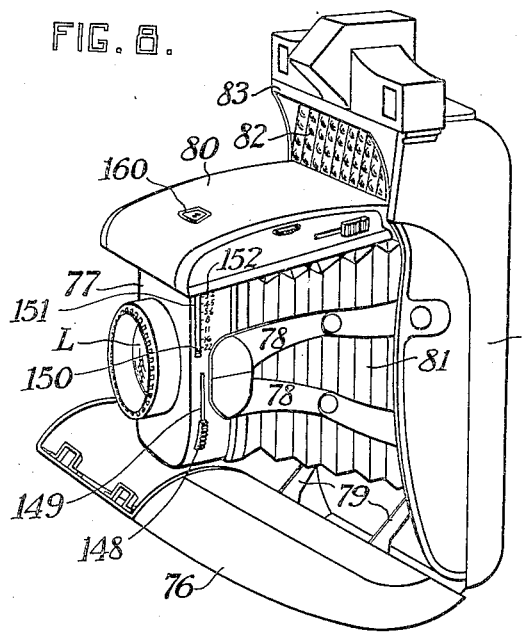
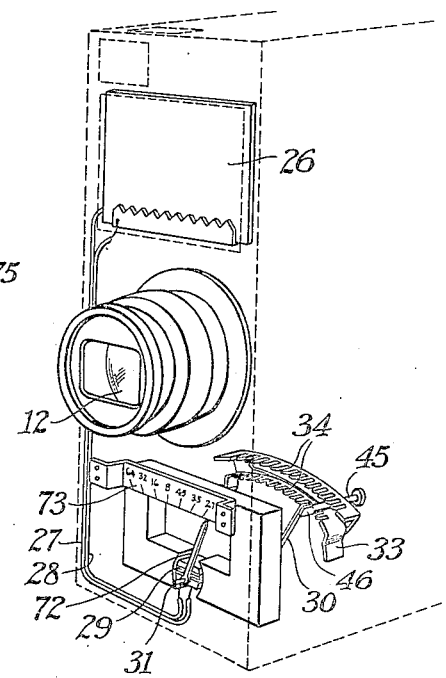
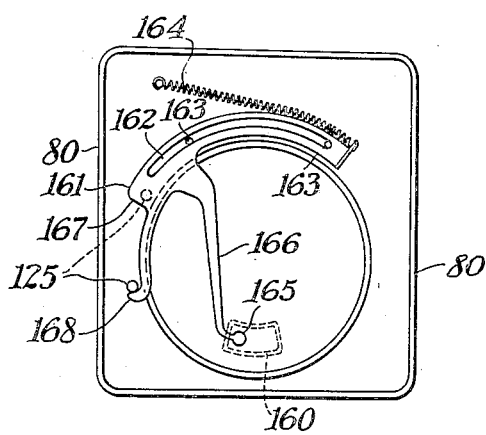
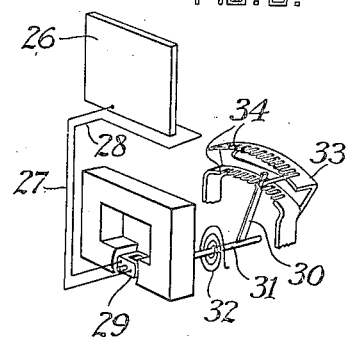
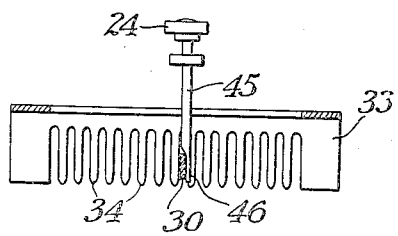
INVENTOR.
Joseph Mihalyi
BY
ATTORNEYS

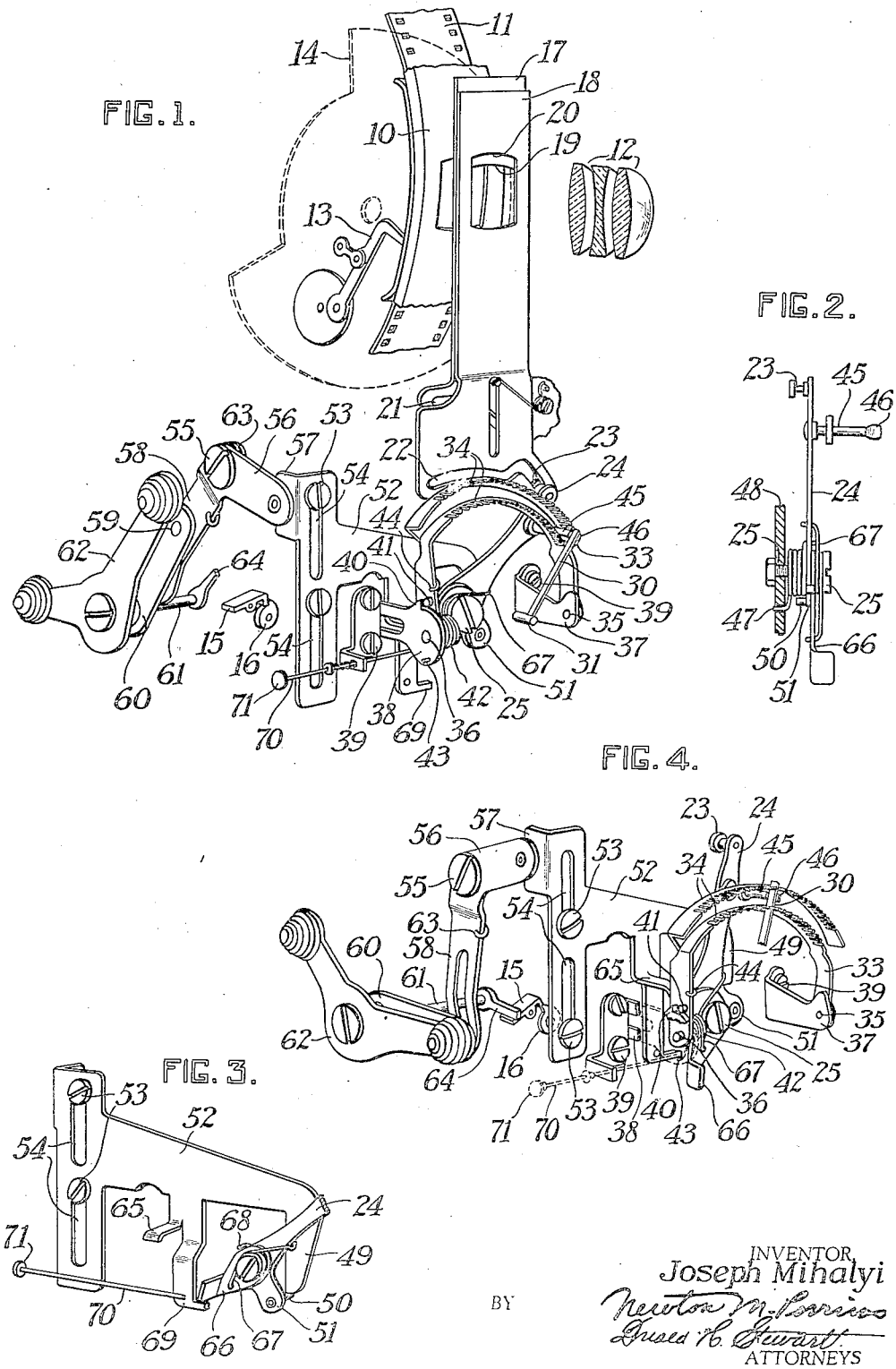

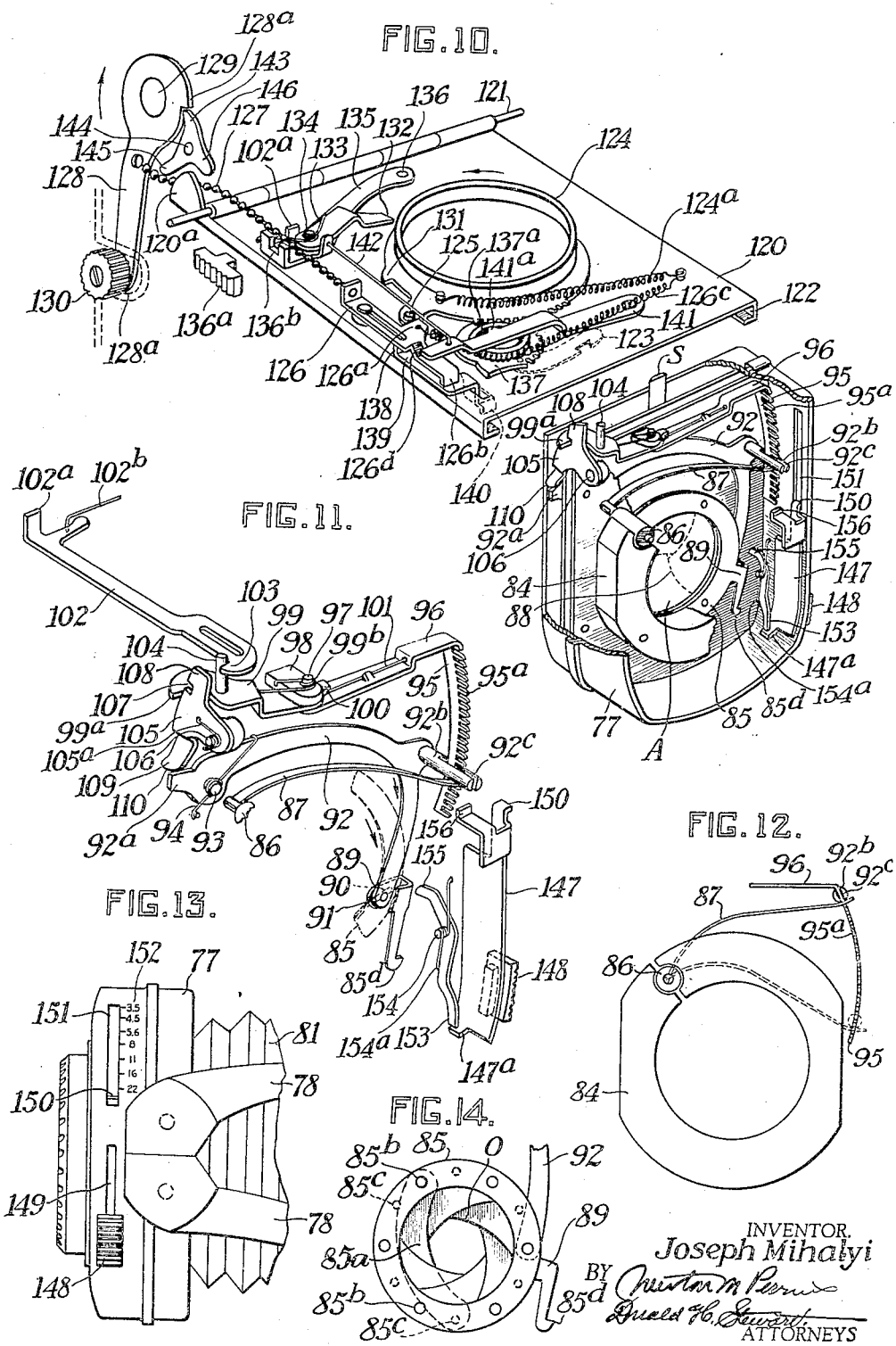

Patented July 26, 1938

2,124,886

UNITED STATES PATENT OFFICE 2,124,886

LIGHT CONTROLLING MECHANISM FOR CAMERAS

Joseph Mihalyi, Rochester, N. Y., assignor to Eastman Kodak Company, Rochester, N. Y., a corporation of New Jersey Application October 20, 1936, Serial No. 106,552

15 Claims. (Cl. 95—64)

This invention relates to photography and more particularly to means for automatically controlling the light passing to a film in a photographic camera.

One object of my invention is to provide an exposure meter built into a photographic camera with a movable arm, and to provide means under the control of the camera operating trigger for positively retaining the arm in a fixed position. Another object of my invention is to provide a camera with a means for holding a comparatively delicate arm in a fixed position, so that it may be used as a stop for other parts of the camera in controlling the light passing to a photographic film. Still another object of my invention is to provide a means for holding the movable arm of an exposure meter comparatively rigid during the time that an exposure is being made, and other objects will appear from the following specification, the novel features being particularly pointed out in the claims at the end thereof.

Coming now to the drawings in which like reference characters denote like parts throughout:

Fig. 1 is a view in perspective showing the mechanism of the invention interconnecting the main operating lever and the diaphragm of a motion picture camera;

Fig. 2 is a side elevation showing the mount for the diaphragm adjusting lever;

Fig. 3 is a view in perspective showing operating means for the diaphragm adjusting lever;

Fig. 4 is a view in perspective of a part of the apparatus shown in Fig. 1 showing the position of the parts during operation of the camera;

Fig. 5 is a perspective view, partly in outline, showing one form of the invention applied to a camera;

Fig. 6 is a perspective view showing diagrammatically the arrangement for actuating the pointer shown in the preceding figures;

Fig. 7 is a sectional detail of the pointer trapping means;

Fig. 8 is a perspective view of a camera in which a modified form of this invention is incorporated;

Fig. 9 is a detail of the camera shown in Fig. 8, including an exposure indicator;

Fig. 10 is a perspective view of the diaphragm control and exposure operating mechanism of a camera similar to that shown in Fig. 8;

Fig. 11 is an enlarged view of certain parts shown in Fig. 10, and some other parts at another point in operation;

Fig. 12 is a diagrammatic elevation of the light-actuated pointer and associated parts; and Fig. 13 is a fragmentary side elevation of the diaphragm casing and adjacent connections of the camera shown in Fig. 8.

Fig. 14 is a plan view of a typical diaphragm.

In accordance with my invention I may bias the movable element of a camera diaphragm to one extreme position and resiliently attach it to the exposure operating trigger, so that the initial movement of the latter carries the element to the opposite extreme of movement, after which a further movement of the lever releases the exposure mechanism or shutter. By resisting the travel of the movable element of the diaphragm, which may be accomplished by inserting an obstacle in its path, its movement will be arrested without stopping the movement of the exposure lever, and consequently, this may be used to determine the amount of light admitted to the film during the exposure. To regulate the positioning of this obstacle, I provide an exposure meter and utilize the pointer of the meter as the obstacle. I likewise provide a means for holding the pointer of the meter rigid, and for preventing it from being bent or deformed when it is used as a stop to limit the movement of the diaphragm controlling arm.

In my copending application Serial No. 715,284, filed March 13, 1934, I have shown and claimed the broad idea of entrapping the pointer of an exposure meter, and in the present application the particular structure by which the needle is held and protected is a primary feature. This application resulted in Patent 2,058,483, granted October 27, 1936.

In Fig. 1 the parts shown of an ordinary motion picture camera include a gate 10 for supporting a film 11 in the focal plane of an objective 12. A pulldown mechanism 13 for advancing the film 11 through the gate 10 is actuated in timed relation with a shutter 14, shown in outline, in any well-known manner upon the actuation of the usual camera release lever 15 to remove it from the path of a notched cam 16 provided in the camera drive mechanism (not shown). For regulating the transmission of light from the objective 12 to the film 11 a suitable diaphragming means is provided and is here shown as comprising two plates 17 and 18 of thin sheet metal properly blackened and provided with substantially rectangular openings 19 and 20, respectively, the overlap of which varies to alter the light opening upon relative vertical movement between the two plates 17 and 18.

For varying the overlap of the two openings 19 and 20 to adjust the diaphragm opening, the two plates 17 and 18 are provided with specially shaped cam slots 21 and 22, respectively. A diaphragm blade stud 23 extending through both of the slots 21 and 22 is mounted on a diaphragm adjusting lever 24 which is pivoted on a bolt 25. Rotation of the lever 24 in a counterclockwise direction, as viewed in Fig. 1, moves the stud 23 in the cam slots 21 and 22 to adjust the diaphragm opening as determined by the overlap of the rectangular openings 19 and 20. The extent to which the diaphragm opening is adjusted is a function of the angle through which the diaphragm adjusting lever 24 is rotated.

From this it is obvious that if the angle through which the lever 24 is rotated is controlled in accordance with the existing light conditions then, other constants of the system being right, the diaphragm opening will be set properly for the existing light and the film will be properly exposed. I accomplish this by positioning a light-sensitive cell 26, as shown in Figs. 5 and 6, which preferably is of the photovoltaic type, to be influenced by light reflected from the subject to be photographed. This cell is connected through leads 27 and 28 to a meter coil 29 which is adapted to variably displace a needle pointer 30 in accordance with the intensity of the light falling on the cell 26. The meter coil 29 is mounted on a shaft 31 which carries the pointer 30 and is provided with the usual balancing spring 32.

A pointer entrapping member 33 comprising two concentric arcuate sets of comb teeth 34 is pivotally mounted at 35 and 36 upon two projecting supports 37 and 38, respectively, which are secured to the camera frame in any suitable manner as by screws 39. The projecting support 38 is provided with an abutment 40 to form a bearing surface for a pin 41 carried by the member 33. The pivot 36 carries a coiled spring 42 having one end 43 secured to the support 38 and its other end 44 bearing against an arm of the member 33 to bias it in a direction such that the pin 41 is held against the abutment 40 as shown in Fig. 1.

When the entrapping member 33 is in the position shown in Fig. 1, its comb teeth 34 are out of the path of the pointer 30 which is therefore free to be deflected in accordance with the activation of the light-sensitive cell 26. The diaphragm adjusting lever 24 is provided with a stop stud 45 having a flattened end portion 46 which coincides with and is movable along the path of the pointer 30 when the lever 24 is rotated to adjust the diaphragm opening as above described. When the needle pointer 30 is in a deflected position, the entrapping member 33 is rotated a slight angle upon its pivots and against the torsion of the spring 42 to entrap the pointer 30 between the comb teeth 34. The diaphragm adjusting lever 24 may now be moved only through the angle determined by the position of the pointer 30, that is, until the flattened portion 46 of the stop stud 45 engages the pointer 30 at which time, due to the shapes of the cam slots 21 and 22, the diaphragm opening will have been adjusted to a value corresponding to the position of the pointer 30. It is, of course, possible that this adjustment could be done manually in a separate operation, but I prefer to perform it automatically and one suitable mechanism for accomplishing this adjustment will now be described.

The diaphragm adjusting lever 24 is biased to hold the diaphragm at its smallest opening by a spring 47 which is, as best shown in Fig. 2, secured at one of its ends in a portion of the camera frame indicated at 48 and has its other end extending through the lever 24. The diaphragm is normally held at its greatest opening against the bias of the spring 47 by a leg 49 bearing down upon a pin 50 carried by an arm 51 formed integrally with the diaphragm adjusting lever 24.

The downwardly projecting leg 49 is formed integrally with a member 52 out of a single piece of sheet metal. This member 52 is suitably mounted on the camera frame by means of headed pins 53 extending through vertical slots 54 which permit the member 52 a limited amount of vertical movement. The mechanism for imparting such vertical movement to the member 52 comprises a bell crank member pivoted at 55 and having an arm 56 secured to an ear 57 formed by bending over a portion of the member 52, and a slotted arm 58 which is slidably connected by means of a pin 59 to an arm 60 rigidly secured to a shaft 61 carrying the main operating lever 62. The bell crank comprised of the arms 56 and 58 is biased to the position shown in Fig. 1 by a spring 63 which is stronger than the spring 47 and therefore is effective to hold the diaphragm adjusting lever 24 in the position shown in Fig. 1.

The main operating lever 62 is adapted to be moved to rotate the shaft 61 through an angle sufficient for an arm 64 carried thereby to engage the camera release lever 15 to remove it from the path of the notched cam 16 and thereby release the camera drive mechanism in a well-known manner. When the shaft 61 is rotated to actuate the camera release 15, it rotates the arm 60 to rotate the bell crank arm 58 against the tension of the spring 63 and thereby move the member 52 vertically upward as above described. The upward movement of member 52 carries with it the leg 49 and permits the spring 47 to rotate the diaphragm adjusting lever 24 in a counter-clockwise direction until stopped by the stop member 45 coming into engagement with the pointer 30 which has been entrapped by the member 33 in the following manner. The member 52 is provided with an outwardly projecting cam 65 which, upon upward movement of the member 52, engages with an arm of the entrapping member 33 to rotate it against the bias of the spring 42 to entrap the pointer 30 as above described.

In the event insufficient light is available for making a proper exposure, the pointer 30 will be deflected a correspondingly small amount and in order to prevent actuation of the camera under such conditions, an interfering member 66 is pivoted on the bolt 25 and interclutched with the diaphragm adjusting lever 24 by means of a spring 67 which biases the member 66 against a bent-over ear portion 68 of the lever 24. The free end of the member 66 extends into the path of a hook member 69 formed in the member 52 so that the member 52 cannot be moved vertically upward until the lever 24 is rotated sufficiently to move the member 66 out of the path of the hook member 69.

By means of this arrangement the camera cannot be operated to make an exposure when the maximum diaphragm opening, such as f. 1. 9, is insufficient to transmit enough light to make a proper exposure. However, should the operator desire to risk an under exposure in an effort to record a picture of a non-recurring nature, I have provided a rod 70 provided with a head 71 extending outside of the camera casing which may be pressed to release the hook member 69 by pushing the member 66 out of the path of the hook and against the biasing force of the spring 67.

The apparatus as shown in Figs. 1 and 4 does not include the light-sensitive cell and the meter element for actuating the pointer 30. However, it is believed to be obvious in view of the exploded view shown in Fig. 6 that the meter and the cell may be compactly arranged immediately in front of the pointer 30 and its entrapping mechanism.

Fig. 5 illustrates an arrangement of my invention as applied to a motion picture camera and shows the light-sensitive cell 26 located above the camera objective and the meter and pointer entrapping mechanism below the objective. In this arrangement an additional pointer 72 may be mounted on the shaft 31 to serve as a visible index related to a scale 73, the latter being mounted behind a transparent opening through which the pointer 72 may be seen, thus providing a built-in photometer which an operator may use under special conditions.

My invention has been specifically illustrated and described as applied to a motion picture camera. Since it is primarily an arrangement for regulating the intensity of light transmitted to a light-sensitive film, my invention is equally applicable to other photographic apparatus where it is desired to regulate the intensity of a beam of light in a similar way.

In cameras of the various types adapted to make successive exposures or single exposures of possibly varying subjects, the same principle of regulating the diaphragm aperture to the subject by means acted upon by light reflected from the subject may be embodied in suitable forms, and I have therefore shown in Fig. 8 a camera similar to that described in my copending application Serial No. 108,396, filed October 30, 1936.

In this modification, the camera has a body portion 75 with a bed 76 hinged thereto, and also a shutter and a diaphragm assembled within a lens mount case 77 which is positioned for operation by linkage 78. Bed braces 79 limit the movement of the bed 76 to the position shown. The case 77 contains only the diaphragm, the lens L, and the exposure parts of the shutter. The setting, release, and timing elements are assembled within a supplemental cover 80, that is hinged to the camera body above the bellows 81 and which is swung to the position of Fig. 8 when the camera is opened, by reason of its sliding connection with the case 77, as set forth in the above-mentioned application, Serial No. 108,396.

In the camera above described, light reaches the sensitive cell 26 through a window 82 of a high light-gathering character that may be above the cover 80 and which may have a projecting visor 83 so that light from the sky or portions outside the scene confronting the lens will not affect the cell.

The meter element that is actuated by current set up through the action of light on the cell 26 preferably comprises a substantially ring-shaped magnet 84 (Fig. 12) encircling the exposure aperture and the diaphragm operating ring 85, and having an armature member 86, the windings of which (not shown) are connected to leads from the cell 26, in a manner similar to Figs. 5 and 6. The pointer 87, fixed to the shaft of the armature 86, is shaped to clear the exposure aperture when deflected to its lower extreme position as indicated in Fig. 12 by broken lines.

Referring to Figs. 10 and 11, the diaphragm operating ring 85 is mounted to rotate through a few degrees around the exposure aperture A, the blades 88 being arranged to move on their pivots from wide open to minimum aperture as the ring 85 rotates. In the present instance rotation of the ring 85 in a counter-clockwise direction, as viewed from the front, opens the diaphragm, and a clockwise rotation reduces the aperture. As shown in Fig. 14, the diaphragm may consist of the usual movable ring 85 to which, pivoted on studs 85b are leaves 85a, the opposite ends of which are pivoted on studs 85c carried by another ring directly beneath 85. Thus, when ring 85 is turned relative to the lower ring, the diameter of the opening O is altered as the leaves 85a change their positions.

The ring 85 has a backwardly-returned lug 89 with an oblique slot 90 into which projects a pin 91 carried in the end of a hook-shaped lever 93, pivoted to the case 77 at 92. This lever, hereinafter referred to as the diaphragm lever, is biased to rotate clockwise on the pivot 93 by the action of a spring 94, so that it constantly tends to move the ring 85 to reduce the exposure aperture. A pin 92b having a longitudinal slot 92c is mounted on the lever 92 and projects forwardly. The pivot 93 is substantially concentric with the axis of the armature 86.

The pointer 87 may be engaged by a toothed entrapping member 95 having comb-like teeth 95a, which operates to hold the pointer against movement in a manner similar to that of the structure illustrated in Figs. 1 and 4. The "comb" 95 depends from a horizontal lever 96, pivoted at 97 on a portion 98 of the casing 77, and lies within the slot 92c in pin 92b. Also movable on the pivot 97 is a lever 99, having a lug 100 extending toward the comb member 95. A spring 101 provides a resilient connection between the comb 95 and the lever 99, so that when the latter is moved backwardly, the comb will be urged toward the pointer 87 only by the spring 101, so that if the pointer fails to enter at once between the teeth of the member 95 it will not become bent or damaged.

The lever 99 is swung rearwardly against the action of a spring 99b to move the comb member 95 and entrap the pointer 87, by means of a part 102 that is slidably mounted and operated in a manner to be described, and adapted, by means of a hooked end 103 to engage a pin 104 on the lever 99. Part 102 is pressed forwardly by a spring 102b. A latch member 105, pivoted at 106 to swing in a vertical plane parallel with the axis of the camera lens, has a notch 107 in its upper arm 108 into which the outer end 99a of lever 99 may enter, and also has a depending arm 109 with a beveled extremity 110 that overlies an arm 92a which is part of diaphragm lever 92. When latch member 105 is rocked on its pivot 106 so that its lower arm 109 moves forward, or in a direction away from the camera, the beveled edge 110 acts as a cam to force the arm 92a downward, and although this movement is slight, the diaphragm lever 92 is swung about the pivot 93 to the upper limit of its travel, and the slotted pin 92b is carried to the top of the "comb" 95. The diaphragm is thus opened to full aperture.

The mechanism for operating the slider 102 and the latch member 105, and also for operating the camera shutter, are all arranged in a manner similar to the construction illustrated in my copending application, Serial No. 108,396, filed October 30, 1936, above referred to. In this construction, all the operating parts are mounted on a plate 120 that is hinged at 121 in the upper portion of the camera body, and which is adapted to be swung downwardly when the camera is folded, by reason of a connection (not shown) between guides 122 on the underside of the plate 120 and the shutter case 77. The operating arm S of the shutter (the latter being behind the diaphragm and not visible in the drawings) projects above the casing 77 and is adapted to be engaged by a link 123 as described in the above-mentioned application.

The shutter setting and operating mechanism is arranged as follows, and as illustrated in Fig. 10: A ring 124 is rotatably mounted on plate 120 and has a pin 125 that projects into the line of travel of a slide bar 126 at one side of the plate. This slide bar is connected by a chain or flexible cable 127 with a winding crank 128, pivoted on the camera at 129, and having a finger knob 130. The ring 124 is constantly urged to rotate as indicated by the adjacent arrow, by a spring 124a. When the crank 128 is moved in a direction indicated by the arrow, the chain 127 pulls the slide bar 126 toward the camera, and a lug 126a on the slide bar engages the pin 125 and the ring 124 is rotated thereby until a projection 131 on its periphery rides past a detent 132. This detent, which is pressed toward the ring 124 by a spring 133, is pivotally mounted at 134 on a part 135 pivoted to the plate 120 at 136, and hereinafter designated as the shutter release. A finger-piece 136a is adapted to fit into a notch 136b and projects through the cover 80 for convenient operation of the shutter release.

When the operating mechanism has been "wound" or set as above described, a disc 137, having a toothed engagement with ring 124, is brought to a position in which link 123 is ready to move the shutter arm S toward one side of the camera and return it to make an exposure. When the shutter release is moved toward the hinge 121, the detent 132 is freed from the projection 131 and the spring 124a may then rotate the ring 124, which, by reason of the toothed connection with disc 137, turns the latter approximately one-half revolution, moving the link and shutter arm as aforementioned.

During the last portion of the movement of the slide bar 126 in "winding" or setting the shutter mechanism, a downturned end 126b on said slide bar engages a portion 138 of another slidable bar 139 guided freely in plate 120. A downturned end 140 on part 139 below plate 120 is adapted to engage the upper end 108 of latch member 105. When the final setting movement occurs, the partial rotation of latch member 105 about its pivot causes its cam end 109 to ride upon the end 92a of the diaphragm lever, and thereby to turn the latter on its pivot 93 until the pin 92b is at the top of the entrapping comb 95, as shown in full lines in Fig. 12, at which time the diaphragm will be at wide open position. Simultaneously with the completion of the movement of the latch member 105 just described, the spring 99b forces the end 99a of lever 99 into notch 107, and thus prevents the latch member 105 from being moved in either direction about its pivot 106, thus holding the diaphragm open.

When the shutter release 135 is operated, it engages an upturned portion 102a on slide bar 102 and moves the latter toward the camera, and thereby disengages the end 99a of lever 99 from the latch member 105, and, through the spring 101, swings the entrapping comb 95 forwardly with its teeth across the pointer 87. Spring 105a then turns the latch member 105 about its pivot 106 so that its lower end 110 moves back from the end 92a of the diaphragm lever 92, and the latter then swings downward under the pressure of spring 94 until the pin 92b stops against the pointer 87. The pointer, being positioned by the action of the reflected light from the subject as before described, will assure that the diaphragm aperture is correct for the subject toward which the camera is directed.

The release of the diaphragm lever just described occurs when the finger-piece 136a and the shutter release lever 135 have been moved a small fraction of their entire travel. Completion of the movement of the finger-piece frees the detent 132 from the projection 131 on ring 124, and the latter opens and closes the shutter.

Means are provided whereby operation of the shutter is prevented if the return stroke of the handle 128 is incomplete and are similar to those shown in my copending application, Serial No. 108,397, filed October 30, 1936. This application has become patented as No. 2,090,060, Aug. 17, 1937. Said means comprise a lever 141 connected by a link 142 with the shutter release 135, and movable with the latter toward or away from the camera. Lever 141 has a downturned lug 141a that projects into an annular recess in a sheave 137a that is a part of disc 137. A raised portion 126d on the slide bar 126 is adapted, as the latter approaches the end of its return stroke under the influence of spring 126c, to lift the free end of lever 141, thereby carrying the lug 141a above the rim of sheave 137a.

With the lug 141a resting in the annular groove of sheave 137a, the shutter release 135 cannot be moved far enough toward the camera to disengage detent 132. It is evident, therefore, that until arm 128 is fully returned into a notch 128a provided for it in the side wall of the camera, the shutter cannot be operated.

After the arm 128 is returned to the notch 128a, a pawl 143, pivoted to the camera at 144, engages a portion 128a of the arm, while a lower extremity 145 of the pawl lies over the chain or cable 127. At the first slight movement of arm 128 in the direction of the arrow, the chain 127 becomes taut, and therefore presses upwardly against part 145, thereby causing the pawl 143 to turn on its pivot 144 sufficiently to move the upper extremity of the pawl to a position where it will permit the operation of arm 128 for the purpose of setting the shutter operating mechanism.

When the camera is folded, that is, when the casing 77 and attached parts are slid back toward the camera under the plate 120 and the latter with its operating mechanism is folded downwardly on the hinge 121, a cam-like arm 120a strikes a forwardly-extending portion 146 of the pawl 143 and moves the pawl so that it remains in engagement with part 128a, and the setting mechanism cannot be operated until the camera is again unfolded.

The foregoing description sets forth the operation of my automatic diaphragm control in its relation to exposures of any predetermined speed. An operator may at times desire to give a longer exposure than that which is allied with automatic control of the aperture, and to meet that requirement I have provided means whereby the diaphragm may be controlled manually. This means includes a manually slidable plate 147 that preferably lies close to one side of the casing 77 and has a finger-piece 148 projecting through a slot 149 (see Figs. 11 and 13). An outwardly-turned end 150 is visible through a slot 151 and serves as an index readable on a scale 152 representing f. values. The plate 147 is normally at its lower limit of movement, and in that position is prevented from being moved upwardly by the depending end 153 of a bell crank member that is forced by a spring 154a to overlie a lug 147a on the plate 147. Said bell crank member is pivoted at 154 and has an upper horizontal arm 155. The latter projects into the path which will be followed by a hook 85d that depends from lug 89 on the diaphragm ring 85, when the latter is rotated counter-clockwise; that is, when the diaphragm lever 92 is raised by the action of the latch-piece 105 as previously described. The diaphragm lever, and therefore the hook 85d, are raised only during the "windup" or setting of the shutter operating mechanism on the plate 120.

Manual determination of the diaphragm opening by the operator is desirable if light conditions, the character of the subject, or other factors, make it advisable to render the automatic diaphragm control ineffective. Therefore, during the last portion of the setting operation, the hook 85d contacts the arm 155 of the bell crank member, and the latter is thus moved about its pivot against the action of spring 154a so that the lower arm 153 is removed from the path of the lug 147a. If now the plate 147 is slid upward by movement of the finger-piece 148 until the index 150 is aligned with the selected f. number on scale 152, a projection 156 on its upper end will be in front of the pointer entrapping member 95, preventing the latter from swinging forward to engage the pointer 87. When the shutter mechanism is released, the spring 94 forces the diaphragm lever downwardly, and the pin 92b carries pointer 87 with it and both come to rest on the upper edge of projection 156. The diaphragm aperture will then have the f. value indicated by the index 150.

The manually controlled plate 147 must be returned to the lower limit of its travel before the automatic control of the diaphragm will again be operative. When the plate 147 is moved downwardly, the lug 147a rides along the lower bell crank arm 153, forcing the latter toward the camera, and when said lug has passed the lower end of arm 153, the arm will be forced by the spring 154a to again overlie the lug 147a as in Fig. 11, and the plate 147 is thus blocked against upward movement until the diaphragm lever is again raised to "full open," which will occur only when the setting of the shutter operating mechanism is completed. The plate 147 is provided with some means, such as a friction drag or a resilient click (not shown in the drawings) to hold it in the selected position, so that it will not be forced downwardly by the striker action of the pin 92b.

In a camera having a shutter and a diaphragm operated as has been described, it is desirable that the operator may know at any time whether the shutter is in the "wound" or set position, or whether the setting mechanism has been released and an exposure made. I therefore provide within the cover 80 that encloses the setting and operating mechanism, a suitable indicator that is readily visible through a window 160 (see Figs. 8 and 9). This indicator preferably comprises a segmental member 161, having an arcuate slot 162 into which pins 163 project, the latter serving as guides whereby member 161 may be moved in a path concentric with the ring 124. A spring 164 tends to rotate the member 161 in a counter-clockwise direction (as viewed from the top) and thereby to project a tab 165 at the end of an arm 166 under window 160.

A shoulder 167 is so positioned that the pin 125 on the ring member 124 will strike this shoulder when the operating mechanism is set, and will carry member 161 around sufficiently to withdraw the tab 165 from under the window 160 and out of the sight of the operator. When the shutter operating mechanism is released, the spring 164 turns the member 161 back to its original position, with tab 165 under the window 160, thus indicating to the operator that an exposure has been made and that the shutter must be reset for the next exposure. A hooked portion 168 on member 161 is so located that the pin 125 may strike it and complete the restoration of tab 165 to indicating position, if, for any reason spring 164 should wholly or partially fail.

I claim:

1. In a photographic camera adapted to contain film, the combination with an exposure meter carried by the camera for measuring light and including an arm variable with variations in light intensity, a comb for holding the arm in a fixed position, a pivotal mount for the comb, spring means urging said comb in one direction, a diaphragm for controlling the quantity of light admitted to the film, a trigger on the camera, operable connections between the trigger and comb, for moving the latter into engagement with the arm, whereby said arm may, with the support of the comb provide a stop for limiting the movement of the diaphragm and a latch member adapted to engage said comb and hold it in engagement with the arm whereby the exposure meter may be inoperative.

2. In a photographic camera adapted to contain film, the combination with an exposure meter carried by the camera for measuring light and including an arm variable with variations in light intensity, a comb for holding the arm in a fixed position, a pivotal mount for the comb, spring means urging said comb in one direction, a diaphragm for controlling the quantity of light admitted to the film, a trigger on the camera, operable connections between the trigger and comb, for moving the latter into engagement with the arm, whereby said arm may, with the support of the comb provide a stop for limiting the movement of the diaphragm and a latch member adapted to engage said comb and hold it in engagement with the arm whereby the exposure meter may be inoperative, and means under the control of the trigger for releasing the latch.

3. In a photographic camera adapted to contain film, the combination with an exposure meter carried by the camera including an arm movable in accordance with varying light intensities, of a diaphragm for admitting light to the film, a diaphragm adjusting arm, a comb movably mounted, means for moving the comb to and from a position in which it holds the meter arm in a fixed position to form a stop for the diaphragm adjusting mechanism, a casing enclosing the diaphragm arm and comb, and means outside of the casing adapted to lock the comb against movement.

4. In a photographic camera adapted to contain film, the combination with an exposure meter carried by the camera including an arm movable in accordance with varying light intensities, of a diaphragm of admitting light to the film, a diaphragm adjusting arm, a comb movably mounted, means for moving the comb to and from a position in which it holds the meter arm in a fixed position to form a stop for the diaphragm adjusting mechanism, a casing enclosing the diaphragm arm and comb, and means outside of the casing adapted to lock the comb against movement, said means including a trigger and operable connections between the trigger and latch.

5. In a photographic apparatus the combination with a camera body, of a shutter of the setting type, a member adapted to be turned to wind the setting shutter, a diaphragm, a diaphragm adjusting lever, a light meter including an arm adapted to move with variations of light, a movably mounted comb for holding said arm in a fixed position, and means connected to the member for setting the shutter for moving the comb from the arm.

6. In a photographic apparatus the combination with a camera body, of a shutter of the setting type, a member adapted to be turned to wind the setting shutter, a diaphragm, a diaphragm adjusting lever, a light meter including an arm adapted to move with variations of light, a movably mounted comb for holding said arm in a fixed position, a latch for holding the comb in its arm holding position, and connections between the member for setting the shutter and the latch for releasing the latter as the shutter is set.

7. In a photographic apparatus the combination with a camera body, of a shutter of the setting type, a member adapted to be turned to set the shutter, a diaphragm, a diaphragm adjusting lever, a light meter including an arm adapted to move with variations of light, a movably mounted comb for holding said arm in a fixed position, mechanism for operating the shutter mechanism including a trigger, connections between the shutter setting member and comb and the trigger and comb for moving the comb from the meter arm by the shutter setting member and means for moving the comb towards the meter arm controlled by the trigger.

8. In a photographic apparatus, the combination with a camera comprising a plurality of relatively foldable parts adapted to move from a folded position to an open, picture-taking position, of a camera shutter of the setting type divided into two parts and housed in two of the relatively movable camera parts, a member adapted to be turned to wind the setting shutter carried by one of the camera parts, a diaphragm, a diaphragm adjusting lever for opening and closing the diaphragm carried by another of the camera parts, and means for connecting the diaphragm setting lever and member for winding the setting shutter for moving the diaphragm as the shutter is set, said connections comprising a plurality of members located on different foldable camera parts and positioned to be brought into operative relationship upon moving the folding camera parts into an open or picture-taking position.

9. In a photographic apparatus, the combination with a camera comprising a plurality of relatively movable parts adapted to be moved from a folded position to an open, picture-taking position, of a camera shutter of the setting type, the mechanism of which is divided into two parts, one part being carried by one foldable camera part and the other part being carried by another foldable camera part, a member adapted to be turned to wind the setting shutter carried by one camera part, a diaphragm, a diaphragm adjusting lever for opening and closing the diaphragm carried by another foldable camera part, and operable connections movable with the winding member for the setting shutter adapted to contact with and move the diaphragm to an open position as said shutter is wound, said operable connections comprising a plurality of movable parts carried by different movable camera parts and positioned to be brought into operative relationship when said camera parts are moved to an open or picture-taking position.

10. In a photographic apparatus, the combination with a camera comprising a plurality of foldable camera parts adapted to move from a folded or compact position to an open, erect, picture-taking position, of a camera shutter of the setting type, the mechanism of which is divided into two sections each mounted in separate foldable camera parts, a member carried by one camera part adapted to be turned to wind the setting shutter, a diaphragm and a diaphragm adjusting lever for opening and closing the diaphragm both carried by another of the camera parts, a slide movable with the shutter and winding member carried by the camera part carrying the first-mentioned shutter parts, a pivoted latch carried by the camera part carrying the diaphragm and diaphragm adjusting lever and lying in the path of the slide and adapted to be moved thereby when the camera parts are moved to an erect or picture-taking position, said diaphragm adjusting lever being adapted to be engaged and moved by the pivoted latch member to open the diaphragm through movement of the slide and to be latched against movement when said camera parts are moved to a folded position.

11. In a photographic apparatus, the combination with a camera comprising a plurality of relatively foldable parts adapted to move from a compact or folded position to an open or picture-taking position, of a camera shutter of the setting type, the mechanism of which is divided into two parts each being carried by a separate section of the folding camera parts, a member adapted to be turned to wind the setting shutter carried by one camera part, a diaphragm and a diaphragm adjusting lever for opening and closing the diaphragm carried by another of the camera parts, a slide movable with the shutter winding member carried by a camera part separate from the part carrying the diaphragm adjusting lever, a pivoted latch in the path of the slide and adapted to be moved thereby and carried by the camera part carrying the diaphragm adjusting lever, said diaphragm adjusting lever being adapted to be engaged and moved by the pivoted latch member to open the diaphragm through movement of the slide, a spring connected to the slide tending to hold it in an inoperative position, whereby said pivoted latch is released as soon as the shutter is wound and the diaphragm has been moved, the folding parts being positioned to move the slide away from the latch when the folding parts of the camera are moved from their picture-taking position, and a spring for moving the release latch to hold the diaphragm adjusting lever in a fixed position when the camera parts are folded.

12. In a photographic apparatus, the combination with a camera body, of a camera shutter of the setting type, a member adapted to be turned to wind the setting shutter, a diaphragm, a diaphragm adjusting lever for opening and closing the diaphragm, and means for connecting the diaphragm setting lever and member for winding the setting shutter for moving the diaphragm as the shutter is set, a swingably mounted comb, a light meter including an arm movable in accordance with light fluctuations across the teeth of the comb, and connections between the shutter winding member and the comb for swinging the latter away from a meter arm engaging position when said shutter winding member is moved to set the shutter.

13. In a photographic apparatus, the combination with a camera body, of a camera shutter of the setting type, a member adapted to be turned to wind the setting shutter, a diaphragm, a diaphragm adjusting lever for opening and closing the diaphragm and means for connecting the diaphragm setting lever and member for winding the setting shutter for moving the diaphragm as the shutter is set, a swingably mounted comb, a light meter including an arm movable in accordance with light fluctuations across the teeth of the comb, said comb being adapted to swing to and from an inoperative position in which the teeth of the comb are spaced away from the path of the meter arm, and means under the control of the shutter winding member for controlling the position of the comb.

14. In a photographic apparatus, the combination with a camera body, of a camera shutter of the setting type, a member adapted to be turned to wind the setting shutter, a diaphragm, a diaphragm adjusting lever for opening and closing the diaphragm, and means for connecting the diaphragm setting lever and member for winding the setting shutter for moving the diaphragm as the shutter is set, a swingably mounted comb, a light meter including an arm movable in accordance with light fluctuations across the teeth of the comb, said comb being adapted to swing to and from an inoperative position in which the teeth of the comb are spaced away from the path of the meter arm, and means under the control of the shutter winding member for controlling the position of the comb, a shutter trigger for releasing the shutter and means under the control of the trigger for releasing the comb from its inoperative position.

15. In a photographic apparatus, the combination with a camera body, of a camera shutter of the setting type, a member adapted to be turned to wind the setting shutter, a diaphragm, a diaphragm adjusting lever for opening and closing the diaphragm and means for connecting the diaphragm setting lever and member for winding the setting shutter for moving the diaphragm as the shutter is set, a swingably mounted comb, a light meter including an arm movable in accordance with light fluctuations across the teeth of the comb, said comb being adapted to swing to and from an inoperative position in which the teeth of the comb are spaced away from the path of the meter arm, and means under the control of the shutter winding member for controlling the position of the comb, a shutter trigger for releasing the shutter and means under the control of the trigger for releasing the comb from its inoperative position, and a spring adapted to move the released comb to entrap the meter arm.

JOSEPH MIHALYI.